United States Patent
Zhang et al.

(10) Patent No.: US 12,132,551 B2
(45) Date of Patent: Oct. 29, 2024

(54) SYSTEM AND METHOD FOR FAST BEAM TRACKING IN A CELLULAR ENVIRONMENT

(71) Applicant: Apple Inc., Cupertino, CA (US)

(72) Inventors: Yushu Zhang, Beijing (CN); Haitong Sun, Cupertino, CA (US); Yakun Sun, Cupertino, CA (US); Weidong Yang, San Diego, CA (US); Wei Zeng, Saratoga, CA (US); Dawei Zhang, Saratoga, CA (US); Rohit U. Nabar, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,456

(22) PCT Filed: Aug. 5, 2020

(86) PCT No.: PCT/CN2020/107189
§ 371 (c)(1),
(2) Date: Sep. 23, 2021

(87) PCT Pub. No.: WO2022/027349
PCT Pub. Date: Feb. 10, 2022

(65) Prior Publication Data
US 2023/0155658 A1     May 18, 2023

(51) Int. Cl.
*H04B 7/00*     (2006.01)
*H04B 7/06*     (2006.01)
*H04W 8/24*     (2009.01)

(52) U.S. Cl.
CPC ............ *H04B 7/0695* (2013.01); *H04W 8/24* (2013.01)

(58) Field of Classification Search
CPC .............................. H04B 7/0695; H04W 8/24
(Continued)

(56) References Cited

U.S. PATENT DOCUMENTS

| | | | |
|---|---|---|---|
| 10,945,253 B2* | 3/2021 | Ko | H04L 5/001 |
| 11,546,043 B2* | 1/2023 | Zhou | H04B 7/0695 |

(Continued)

FOREIGN PATENT DOCUMENTS

| | | |
|---|---|---|
| CN | 109151842 A | 1/2019 |
| CN | 110249573 A | 9/2019 |
| WO | WO 2019/166100 A1 | 9/2019 |

OTHER PUBLICATIONS

International Search Report and Written Opinion of the International Searching Authority directed to related International Patent Application No. PCT/CN2020/107189, mailed Apr. 26, 2021; 11 pages.

(Continued)

*Primary Examiner* — April G Gonzales
(74) *Attorney, Agent, or Firm* — Sterne, Kessler, Goldstein & Fox P.L.L.C.

(57) ABSTRACT

Methods and apparatuses are disclosed for performing fast beam tracking in a wireless communication environment. A UE signals to a gNB its capabilities for intra-symbol beam sweeping. Depending on configuration, the UE can either assume that the intra-symbol beam sweeping configuration will be implemented, or will await a response from the gNB before implementing intra-symbol beam sweeping. Although this is generally carried out during initial access between the UE and the gNB, the beam sweeping configuration can be dynamically updated by either the UE or the gNB during established communication. For example, the UE can signal a desired change via its MAC CE, and the gNB can signal its change to the UE via DCI.

13 Claims, 8 Drawing Sheets

(58) Field of Classification Search
USPC .......................................................... 455/101
See application file for complete search history.

(56) References Cited

U.S. PATENT DOCUMENTS

| | | | |
|---|---|---|---|
| 11,546,906 B2* | 1/2023 | John Wilson | H04L 1/18 |
| 11,582,771 B2* | 2/2023 | Zhou | H04B 7/0617 |
| 11,622,284 B2* | 4/2023 | Hwang | H04W 72/046 |
| | | | 370/329 |
| 2007/0173279 A1* | 7/2007 | Kuroda | H04W 52/281 |
| | | | 455/522 |
| 2018/0219606 A1* | 8/2018 | Ng | H04L 25/0204 |
| 2019/0223163 A1* | 7/2019 | Ko | H04W 72/23 |
| 2019/0289530 A1* | 9/2019 | Ko | H04L 5/001 |
| 2019/0356371 A1* | 11/2019 | Osawa | H04W 88/02 |
| 2020/0074988 A1* | 3/2020 | Park | G06N 3/045 |
| 2021/0152447 A1* | 5/2021 | Yang | H04W 16/28 |
| 2021/0393446 A1* | 12/2021 | Arizti | A61F 13/42 |

OTHER PUBLICATIONS

3GPP, "On CSI-RS for beam management," R1-1706162, Apr. 7, 2017, accessed at https://www.3gpp.org/ftp/TSG_RAN/WG1_RL1/TSGR1_88b/Docs/?sortby=namerev.

* cited by examiner

SYSTEM AND METHOD FOR FAST BEAM TRACKING IN A CELLULAR ENVIRONMENT

This application is a U.S. National Phase of International Application No. PCT/CN2020/107189, filed Aug. 5, 2020, which is hereby incorporated by reference in its entirety.

FIELD

Various aspects generally may relate to the field of wireless communications.

SUMMARY

Some embodiments include an apparatus, method, and computer program product for implementing fast beam tracking in a wireless communication environment. In Rel-15 of the Third Generation Partnership Project (3GPP), the Synchronization Signal Block (SSB) and Channel State Information Reference Signal (CSI-RS) are used for beam measurement and reporting. Conventionally, one SSB includes four symbols. Therefore, the gNB may be able to apply different beams to the different symbols of the SSB, resulting in up to four received beams for one SSB. On the other hand, the CSI-RS only includes one symbol in the current specification. Therefore, in an embodiment, an Interleaved Frequency Division Multiple Access (IFDMA) structure is used to transmit beams via CSI-RS.

If the gNB transmits anything other than this structure, the UE will observe interference from other elements and will be unable to observe the repetitions. Likewise, if the UE applies intra-symbol beam sweeping, the UE may not be able to receive other signals in the same symbol by the same panel. As a result, the UE will be unable to carry out the intra-symbol beam sweeping.

Therefore, aspects of the present disclosure ensure that the gNB does not transmit anything that could interference with these CSI resources so as to allow for intra-symbol beam sweeping. Aspects of the disclosure for achieving this objective include signaling the UE to report whether intra-symbol UE will be used, control signaling to configure whether intra-symbol UE beam sweeping can be used, and simultaneous reception for CSI-RS with intra-symbol beam sweeping and other signals.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

DETAILED DESCRIPTION

Beam sweeping is a technique in which a next generation nodeB (gNB) transmits beams in all predefined directions in a burst at a regular interval. The first step in a mobile terminal (user equipment, UE) attach procedure is Initial Access, which is to synchronize with the gNB and to receive minimum system information broadcast. Therefore, each of the beams carries an Synchronization Signal Block (SS Block or SSB) that carries a primary synchronization signal (PSS), secondary synchronization signal (SSS), and Physical Broadcast Channel (PBCH) necessary to allow the UE to properly synchronize with the gNB.

Upon receipt of the transmitted signal from the gNB, the UE performs a measurement operation with respect to each of the transmitted beams in order to determine a best or preferred beam from among those transmitted by the gNB. The UE then reports the selection to the gNB for future transmissions.

Figure 1:
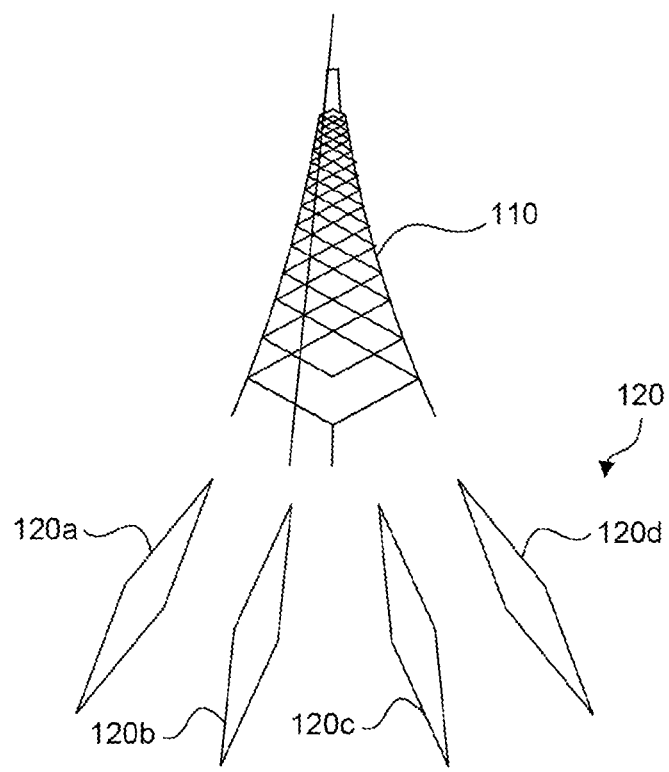
FIG. 1 illustrates an exemplary wireless communication environment according to an aspect of the disclosure.
Figure 1:
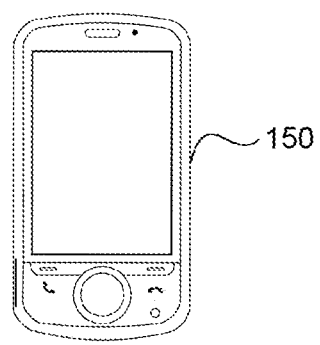

FIG. 1 illustrates an exemplary wireless communication environment 100 according to an aspect of the present disclosure. Example system 100 is provided for the purpose of illustration only and does not limit the disclosed aspects. System 100 may include, but is not limited to, network node (for example, a base station such as eNB, gNB, etc.) 110 and electronic device (for example, a UE) 150. Electronic device 150 (hereinafter referred to as the UE 150) may include an electronic device configured to operate based on a wide variety of wireless communication techniques. These techniques may include, but are not limited to, techniques based on 3rd Generation Partnership Project (3GPP) standards. For example, the UE 150 may include an electronic device configured to operate using Release 15 (Rel-15), Release 16 (Rel-16) or subsequent 3GPP releases. The UE 150 may include, but is not limited to, wireless communication devices, smart phones, laptops, desktops, tablets, personal assistants, monitors, televisions, wearable devices, Internet of Things (IoTs), vehicle communication devices, and the like. The network node 110 (herein referred to as base station) may include nodes configured to operate based on a wide variety of wireless communication techniques such as, but not limited to, techniques based on 3GPP standards. For example, the base station 110 may include nodes configured to operate using Rel-15, Rel-16, or subsequent 3GPP releases. In some aspects, the base station may belong to a cell. The UE 150 may connect with the cell via the base station 110. The cell may be a primary cell of the UE 150.

As shown in FIG. 1, the gNB 110 communicates with the UE 150 over a wireless communication channel. During Initial Access, the gNB 100 transmits several beams 120 to the UE. As shown in FIG. 1, each of the beams 120a, 120b, 120c, and 120d are transmitted in different directions toward the UE 150. The UE 150 receives the transmitted beams 120, performs the beam measurement, and then reports the preferred beam back to the gNB 110 for future transmission.

In Rel-15 of the Third Generation Partnership Project (3GPP), the SSB and Channel State Information Reference Signal (CSI-RS) are used for beam measurement and reporting. Conventionally, one SSB includes four symbols. Therefore, the gNB may be able to apply different beams to the different symbols of the SSB, resulting in up to four received beams for one SSB. On the other hand, the CSI-RS only includes one symbol in the current specification. Therefore, in an embodiment, an Interleaved Frequency Division Multiple Access (IFDMA) structure is used to transmit beams via CSI-RS.

Figure 2:
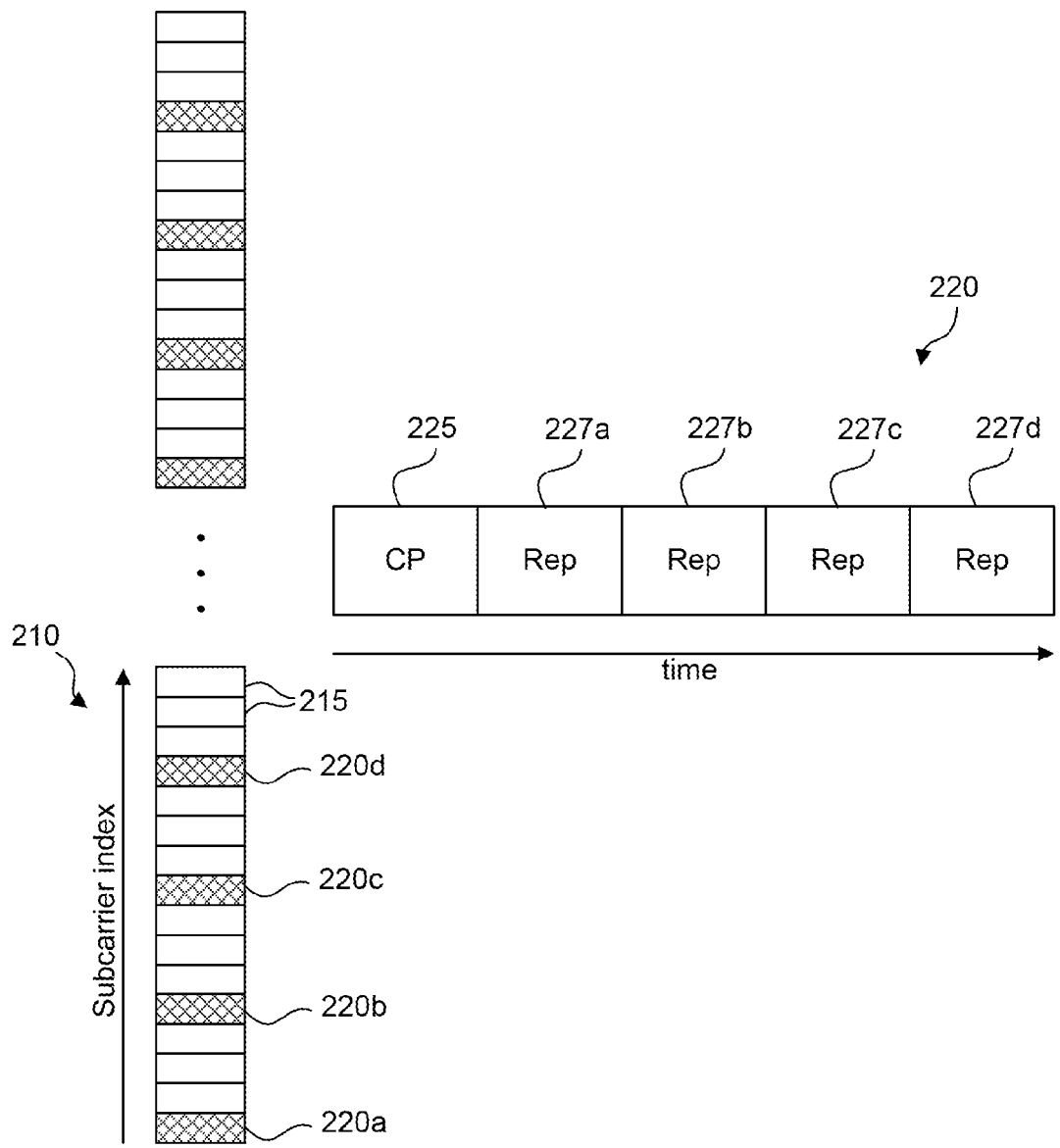
FIG. 2 illustrates an exemplary CSI-RS frame according to an aspect of the present disclosure.

FIG. 2 illustrates an exemplary CSI-RS frame according to an aspect of the present disclosure. As shown in FIG. 2, the CSI-RS 210 is illustrates in the frequency domain relative to the subcarriers 215. Some of those subcarriers are loaded with beam information 220 in the CSI-RS. When converted from the frequency domain to the time domain, the CSI-RS 220 includes a cyclic prefix (CP) 225, followed by multiple repetitions 227. These repetitions 227*a-d* in the time domain respectively correspond to the beam information 220*a-d* located in the frequency domain CSI-RS. These repetitions give the UE an opportunity to receive different beams in the same symbol, enabling intra-symbol beam sweeping.

Figure 3:
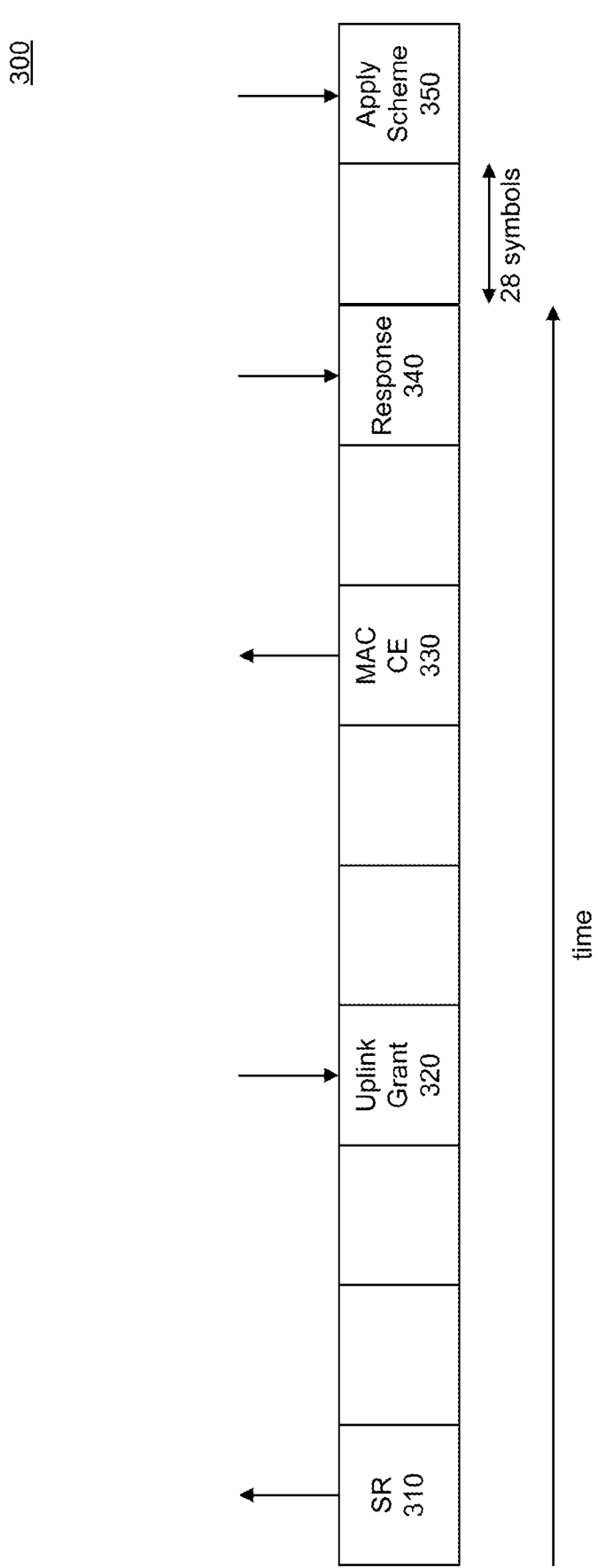
FIG. 3 illustrates a communication schedule from the perspective of a UE according to an aspect of the present disclosure.

If the gNB transmits anything other than this structure, the UE will observe interference from other elements and will be unable to observe the repetitions. Likewise, if the UE applies intra-symbol beam sweeping, the UE may not be able to receive other signals in the same symbol by the same antenna panel. As a result, the UE will be unable to carry out the intra-symbol beam sweeping that is shown in FIG. 3.

Therefore, an aspect of the present disclosure is to ensure that the gNB does not transmit anything that could interference with these CSI resources that carry beam information so as to allow for intra-symbol beam sweeping. Aspects of the disclosure for achieving this objective include signaling the UE to report whether intra-symbol UE beam sweeping will be used, control signaling to configure whether intra-symbol UE beam sweeping can be used, and simultaneous reception for CSI-RS with intra-symbol beam sweeping and other signals.

Signaling/Beam Sweeping Scheme

In a first aspect of the present disclosure, signaling is employed to allow for the UE to notify the gNB as to whether intra-symbol beam sweeping will be used for I-port CSI-RS. In an embodiment, this is based on UE capability.

There are multiple different CSIs defined in the 3GPP specification. For example, one such type is used for Layer 1 Reference Signal Receiving Power (L1-RSRP) or Layer 1 Signal-to-Interference plus Noise (L1-SINR) measurement, another is for beam failure detection, another for radio link monitoring, etc. Further, some types of CSIs are configured with repetition, whereas others are not. In a first embodiment, the UE signals to the gNB whether it supports intra-symbol beam sweeping for generically for all CSIs. In this case, only one bit is required to convey this information.

In another embodiment, the UE signals to the gNB whether it supports intra-symbol beam sweeping for different groups of CSI types, or separately for each CSI type. For example, the UE can signal whether it supports intra-symbol beam sweeping for repetition-type CSIs. Alternatively, the UE can signal whether it supports intra-symbol beam sweeping for each individual CSI. In this scenario, multiple bits (e.g. 3 bits) are required to convey this information.

Once the UE has completed this signaling to the gNB, the system must then be configured for how to operate based on the UE signaling to ensure that the UE accurately predicts the subsequent transmissions from the gNB. In a first embodiment, the gNB is configured not to multiplex any other signals with the symbol designated for beam sweeping. In other words, the gNB does not transmit downlink signals in the unused resource elements within the resource blocks allocated for CSI-RS or the active bandwidth part. As a result, the UE can assume that no other signals will be multiplexed with the beam sweeping symbol, and intra-symbol beam sweeping can be carried out immediately following the UE reporting to the gNB.

In another embodiment, the gNB is able to transmit other signals at the same time as the beam sweeping symbol, but is configured to do so only in an uncorrelated direction. In other words, the gNB does not transmit downlink signal that is spatially correlated with the CSI-RS in the unused resource elements within the resource blocks allocated for CSI-RS of the active bandwidth part. The gNB is still permitted to transmit non-correlated signals because such signals introduce only weak interference.

In another embodiment, the gNB replies to the UE signaling with response signaling. In particular, when the UE reports its capabilities, the gNB transmits response signaling to the UE indicating whether the intra-frequency beam sweeping feature is enabled. In an embodiment, this response signal is performed via Radio Resource Control (RRC) signals. Additionally, the indication to the UE can be configured per CSI-RS resource or per CSI-RS resource set.

3gpp specification 38.321 (e.g., version 16.1.0, released Jul. 24, 2020), section 6.3.2 defines conventional RRC signaling. In an embodiment, that RRC signaling can be modified as follows: " . . . intraSymbolBeamSweeping ENUMERATED (enabled) OPTIONAL, —Need R" is added to the sequence for NZP-CSI-RS-Resource or NZP-CSI-RS-ResourceSet.

In the above embodiment, signaling takes place during initial or early stages of communication with the gNB. However, changing conditions and/or circumstances may necessitate a need for a change in the intra-symbol beam sweeping configurations. For example, once the gNB enables intra-symbol beam sweeping, it cannot transmit anything else in the same signal (as discussed above). This introduces scheduling restrictions for the gNB. Therefore, in an embodiment, signaling can be dynamically performed to update intra-symbol beam sweeping configurations over time.

In this embodiment, the gNB can indicate whether the UE can do intra-symbol beam sweeping for an aperiodic CSI-RS resource or resource set using downlink control information (DCI) or DCI and RRC signaling. In one configuration, the gNB can indicate via a new field in the DCI whether intra-symbol beam sweeping is allowed. In a second configuration, an existing field can be used to indicate the beam sweeping change with a new RRC parameters. For example, the CSIRequest field can be reused for this purpose. In this configuration, an indication of whether intra-symbol beam sweeping is enabled can be added to the RRC parameter CSI-AssociatedReportConfigInfo or CSI-AperiodicTriggerState.

In another configuration, the gNB can dynamically inform the UE whether it is permitted to do intra-symbol beam sweeping using the starting control channel element (CCE) index for the DCI. In effect, the gNB uses the structure of the Physical Downlink Control Channel (PDCCH) to imply to the UE whether the UE can do beam sweeping. Because no field is required in this configuration, overhead is reduced. The CCE index is used to determine the location in the signal of the PDCCH.

The beam-sweeping enablement in this embodiment is based on the location of the PDCCH. Thus, for a different location, the UE infers whether intra-symbol beam sweeping is enabled. In one such configuration, a particular index (e.g., location) indicates that intra-symbol beam sweeping is allowed. All other indexes do not. In another configuration, the indication of whether beam sweeping is allowed is based on whether the index is odd or even, with one indicating that beam sweeping is allowed and the other indicating that it is prohibited.

Specification 38.321 (section 6.3.2) defines current DCI and RRC signaling. In an embodiment, dynamic signaling can be achieved using a CSI-AperiodicTriggerState sequence to include "intraSymbolBeamSweeping ENUMERATED {enabled} OPTIONAL, —Need R" and by using a CSI-AssociatedReportConfigInfo sequence to include "intraSymbolBeamSweeping ENUMERATED {enabled} OPTIONAL, —Need R."

Much like with the gNB, the situation for the UE may also change over time. Therefore, in an embodiment, the UE is also capable of dynamically notifying the gNB as to whether intra-symbol beam sweeping should be configured. In an embodiment, this signaling is performed in the Medium Access Control (MAC) Control Element (CE) of the UE's uplink transmission.

FIG. 3 illustrates a communication schedule 300 from the perspective of a UE according to an aspect of the present disclosure. As shown in FIG. 3, the schedule 300 includes several uplink transmissions and downlink transmissions in the time domain. The schedule begins by the UE transmitting a scheduling request (SR) to the gNB. In response, the UE receives a uplink grant 320 from the gNB designating time-frequency slots during which the UE can transmit. Thereafter, the UE transmits its MAC CE 330 to the gNB that includes the beam sweeping notification.

After processing the information, the gNB responds to the MAC CE 330 with a MAC CE response 340, indicating to the UE whether beam sweeping has been configured. In an embodiment, the response is an uplink grant to scheme a new transmission for the same Hybrid Automatic Repeat Request (HARQ) process as that used to transmit the MAC CE 330. Subsequently, the gNB applies the beam sweeping scheme 350 reported by the MAC CE. To allow for configuration of the UE and gNB, a minimum of 28 symbol is provided between the response 340 and the application of the beam sweeping scheme 350. However, the disclosure is not limited to the 28 symbol minimum. This symbol minimum can be predefined or reported by a UE capability. In an embodiment, the MAC CE 330 is triggered by the scheduling request 310 that is dedicatedly configured by RRC. If there is no SR configured, then the UE instead uses normal signaling request or Physical Random Access Channel (PRACH). In an embodiment, intra-symbol beam sweeping is disabled by default.

When the UE is relatively stable, dynamic signaling may be unnecessary. However, if the UE is moving very fast, it can be important for the UE to try several beams. In this situation, dynamic signaling becomes significantly more useful.

Simultaneous Reception

If the UE wants to do intra-symbol, it cannot receive any other signal during the designated time period. In this case, if the gNB desires to transmit additional information, such as a control element (CE) on a different component carrier at the same time as the beam-sweeping symbol, then the UE must be capable of processing this simultaneous information. For example, for a single-antenna panel UE (e.g., a UE that does not support QCL-type D and/or receiver beamforming), the UE cannot receive the CSI-RS with the intra-symbol beam sweeping and other signals from the same serving cell or different serving cells in the same band or band group, although they may be configured with the QCL-typeD.

Therefore, embodiments are provided to configure the UE for simultaneous reception. In a first such embodiment, simultaneous reception is simply prohibited. As a result, the gNB should not schedule any other signals during the beam sweeping symbol. In a second embodiment, priority rules are predefined that dictate whether the UE drops the CSI-RS or the other interfering signals.

In still a further embodiment, the UE can be configured to automatically disable intra-symbol beam sweeping upon receipt of multiple signals. In this embodiment, the UE receives the CSIs and the Physical Downlink Shared Channel (PDSCH) together. Transmission Configuration Indicator (TCI) is a beam indication for a downlink signal. In this embodiment, the action time for TCI state indication based on reception of CSI-RS should assume that the UE applies symbol level beam sweeping. In other words, if the gNB indicates to the UE to switch to beam 1, enough time should be allotted to allow the UE to do beam sweeping to check beam 1. If the UE does symbol level beam sweeping for 8 received beams, for example, the gNB is configured to reserve 8 symbols as delay for beam sweeping (one symbol for each beam). Meanwhile, if the UE is configured for intra-symbol beam sweeping, then the gNB reserves 2 symbols as action time for the new TCI state. In an embodiment, these action time configurations are predefined in the 3gpp specification.

Figure 4:
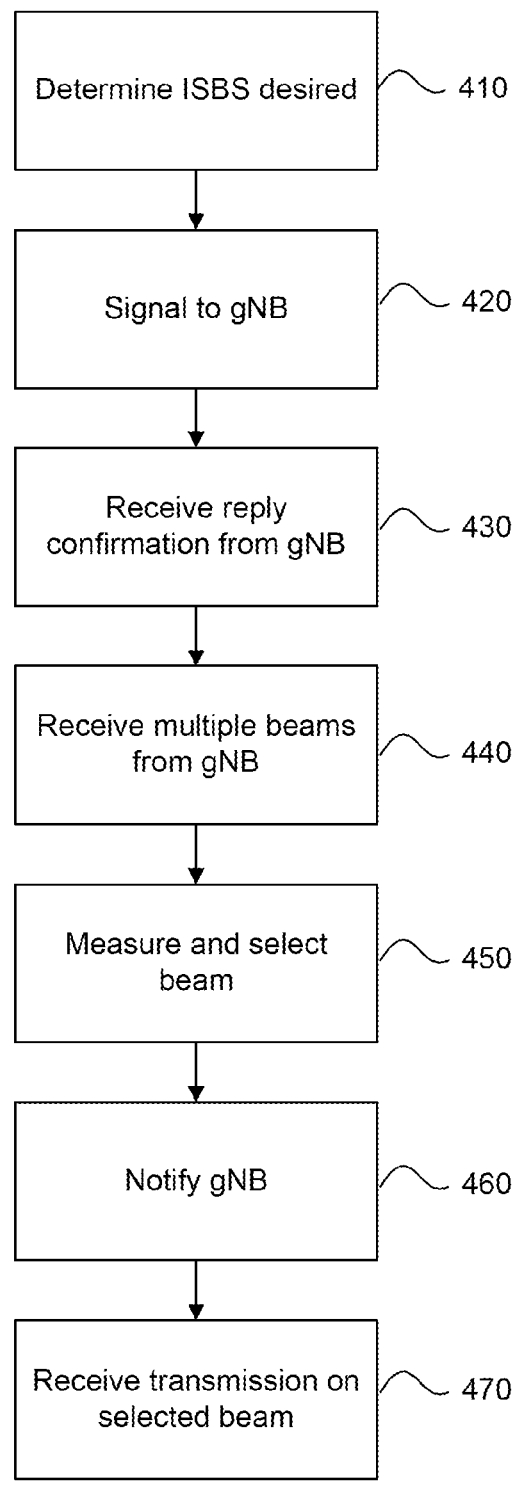
FIG. 4 illustrates a flowchart diagram of an exemplary method for performing fast beam tracking by a UE according to an embodiment.

FIG. 4 illustrates a flowchart diagram of an exemplary method 400 for performing fast beam tracking by a UE according to an embodiment. As shown in FIG. 4, the UE determines that intra-symbol beam sweeping is desired (410). As described above, beam sweeping is the process by which the gNB transmits multiple beams to the UE that cover a spatial area. Intra-symbol beam sweeping is described above in reference to FIG. 2, and enables the UE to receive and evaluate multiple beams in a single symbol. As a result, the UE signals its intra-symbol beam sweeping capability to the gNB (420). In reply, the UE receives a confirmation message from the gNB (430) notifying the UE that intra-symbol beam sweeping has been enabled. In embodiments, this reply signal can be configured per CSI-RS resource or per CSI-RS resource set by RRC signaling. In various embodiments, this step is optional or can be omitted.

Thereafter, the UE receives multiple transmitted beams from the gNB (440). The UE performs measurements with respect to each of the beams (450). Based on the measurements, the UE identifies a best or preferred beam from among the received beams, and then notifies the gNB (460) of the selected beam. Thereafter, the UE receives a transmission from the gNB on the selected beam (470).

Figure 5:
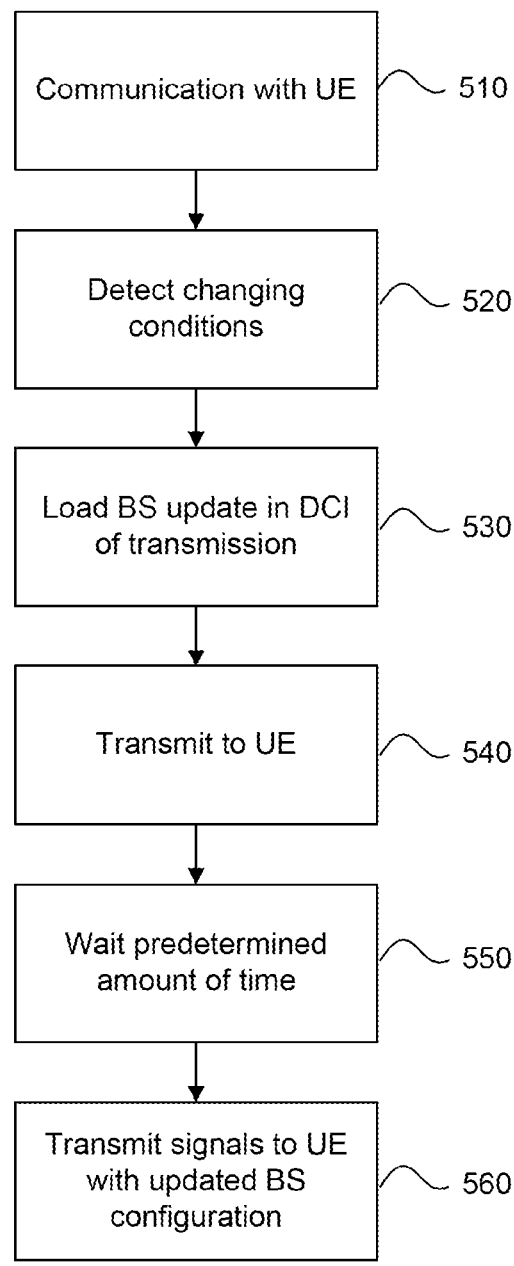
FIG. 5 illustrates a flowchart diagram of an exemplary method for dynamically changing an intra-symbol beam sweeping configuration according to an embodiment.

FIG. 5 illustrates a flowchart diagram of an exemplary method 500 for dynamically changing an intra-symbol beam sweeping configuration according to an embodiment. As shown in FIG. 5, the gNB has established communication with the UE under a particular communication and/or beam sweeping scheme (510). At some point thereafter, the gNB detects a change in conditions (520) for which it would like alter the scheme. As discussed above, this change of conditions can include a variety of factors, including bandwidth concerns, channel conditions, or if a movement state of the UE changes. As a result of the changing conditions, the gNB generates downlink control information (DCI) that includes a beam sweeping update for transmission to the UE (530) and then transmits the DCI to the UE (540). In an embodiment, the beam sweeping update is for an aperiodic CSI-RS resource or resource set. In an embodiment, the beam sweeping update is provided to the UE via DCI and RRC signaling.

After transmitting the response to the UE, the gNB waits a predetermined amount of time (550) to allow the UE to reconfigure. Then the gNB begins transmitting signals to the UE using the updated beam sweeping configuration (560) notified in the DCI.

Figure 6:
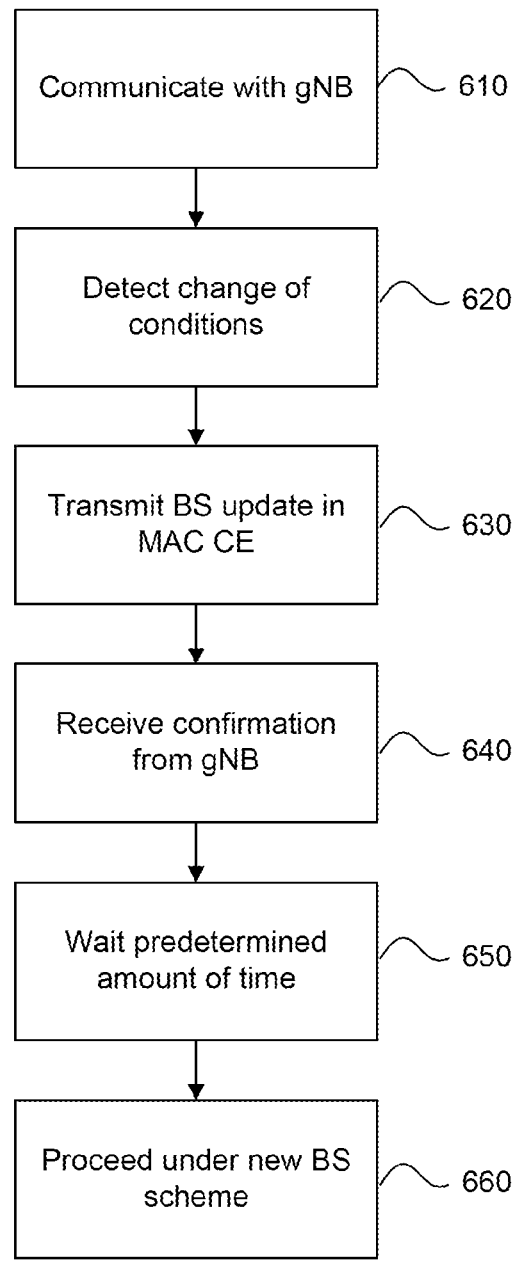
FIG. 6 illustrates a flowchart diagram of an exemplary method for dynamically changing an intra-symbol beam sweeping configuration according to an embodiment.

FIG. 6 illustrates a flowchart diagram of an exemplary method 600 for dynamically changing an intra-symbol beam sweeping configuration according to an embodiment. As shown in FIG. 6, a UE is communicating with a gNB under a current communication and/or beam sweeping scheme. The UE then detects a change of conditions (620) for which a change in scheme is desired. In response, the UE transmits a beam sweeping update in the MAC CE (630) of its uplink transmission.

In response, the UE receives a confirmation message from the gNB (640). Thereafter, the UE waits a predetermined amount of time (650) and then proceeds assuming that the new beam sweeping scheme has been activated (660).

Although the above method has been described according to one implementation, it should be understood that many of the steps may be carried out in different order or omitted according to the specific circumstances of the application.

Figure 8:
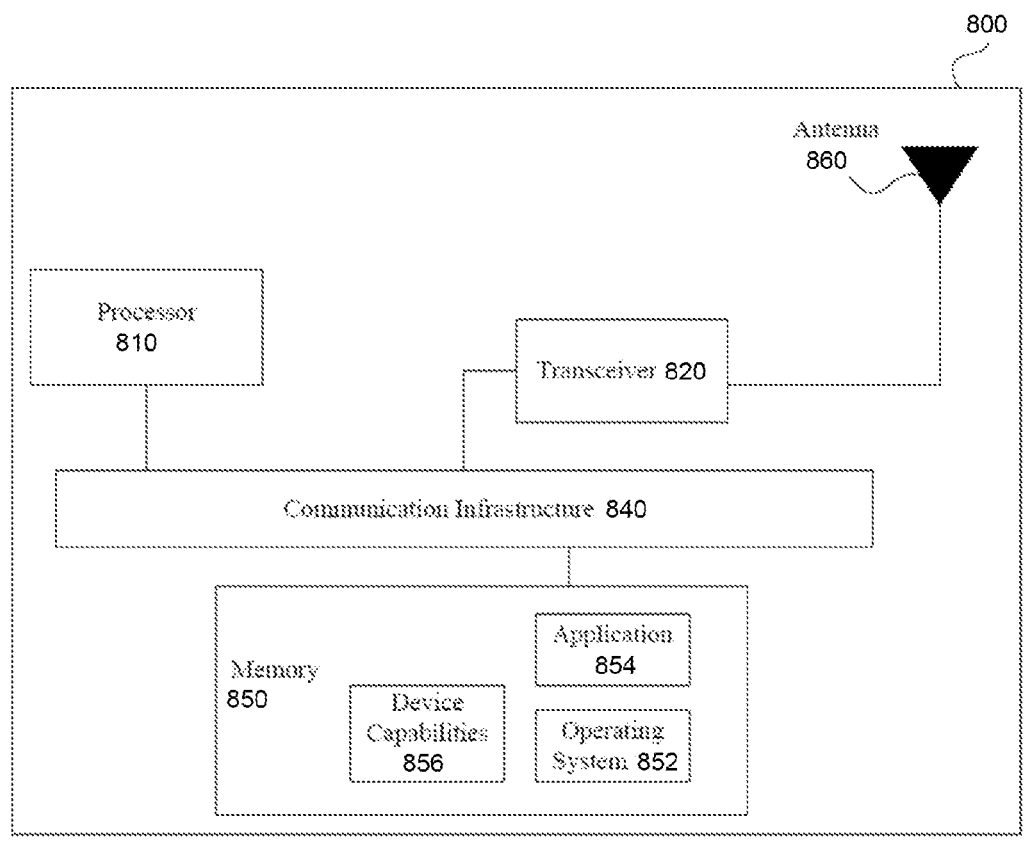
FIG. 8 illustrates a block diagram of an example system of an electronic device, according to some aspects of the disclosure.

FIG. 8 illustrates a block diagram of an example system 800 of an electronic device implementing various aspects of fast beam tracking according to some aspects of the disclosure. System 800 may be any of the electronic devices (e.g., the base station 110, the UE 150) of system 100. The system 800 includes a processor 810, one or more transceivers 820, communication infrastructure 840, memory 850, operating system 852, application 854, and one or more antenna 860. Illustrated systems are provided as exemplary parts of system 800, and system 800 can include other circuit(s) and subsystem(s). Also, although the systems of system 800 are illustrated as separate components, the aspects of this disclosure can include any combination of these, less, or more components.

Memory 850 may include random access memory (RAM) and/or cache, and may include control logic (e.g., computer software) and/or data. Memory 850 may include other storage devices or memory such as, but not limited to, a hard disk drive and/or a removable storage device/unit. According to some examples, operating system 852 can be stored in memory 850. Operating system 852 can manage transfer of data from memory 850 and/or one or more applications 854 to processor 810 and/or one or more transceivers 820. In some examples, operating system 852 maintains one or more network protocol stacks (e.g., Internet protocol stack, cellular protocol stack, and the like) that can include a number of logical layers. At corresponding layers of the protocol stack, operating system 852 includes control mechanism and data structures to perform the functions associated with that layer.

According to some examples, application 854 can be stored in memory 850. Application 854 can include applications (e.g., user applications) used by wireless system 800 and/or a user of wireless system 800. The applications in application 854 can include applications such as, but not limited to, Siri™, FaceTime™, radio streaming, video streaming, remote control, and/or other user applications.

System 800 can also include communication infrastructure 840. Communication infrastructure 840 provides communication between, for example, processor 810, one or more transceivers 820, and memory 850. In some implementations, communication infrastructure 840 may be a bus. Processor 810 together with instructions stored in memory 850 performs operations enabling system 800 to implement fast beam tracking operations, as described herein for the system 100, as discussed above.

One or more transceivers 820 transmit and receive intra-symbol beam sweeping messages. According to some aspects, one or more transceivers 820 may be coupled to antenna 860. Antenna 860 may include one or more antennas that may be the same or different types. One or more transceivers 820 allow system 800 to communicate with other devices that may be wired and/or wireless. In some examples, one or more transceivers 820 can include processors, controllers, radios, sockets, plugs, buffers, and like circuits/devices used for connecting to and communication on networks. According to some examples, one or more transceivers 820 include one or more circuits to connect to and communicate on wired and/or wireless networks.

According to some aspects of this disclosure, one or more transceivers 820 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 820 can include more or fewer systems for communicating with other devices.

In some examples, one or more transceivers 820 can include one or more circuits (including a WLAN transceiver) to enable connection(s) and communication over WLAN networks such as, but not limited to, networks based on standards described in IEEE 802.11.

Additionally, or alternatively, one or more transceivers 820 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceiver 820 can include a Bluetooth™ transceiver.

Additionally, one or more transceivers 820 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 820 can be configured to operate according to one or more of Rel-15, Rel-16, Rel-17, or later of 3GPP standard.

According to some aspects of this disclosure, processor 810, alone or in combination with computer instructions stored within memory 850, and/or one or more transceiver 820, implements the methods and mechanisms discussed in this disclosure. For example, processor 810, alone or in combination with computer instructions stored within memory 850, and/or one or more transceiver 820, implements mechanisms for fast beam tracking. According to some aspects of this disclosure, processor 810, alone or in combination with computer instructions stored within memory 850, and/or one or more transceiver 820, can transmit a message to a base station (for example base station 110 of FIG. 1) notifying the base station of the intra-symbol beam sweeping capabilities of the device 800.

Figure 7:
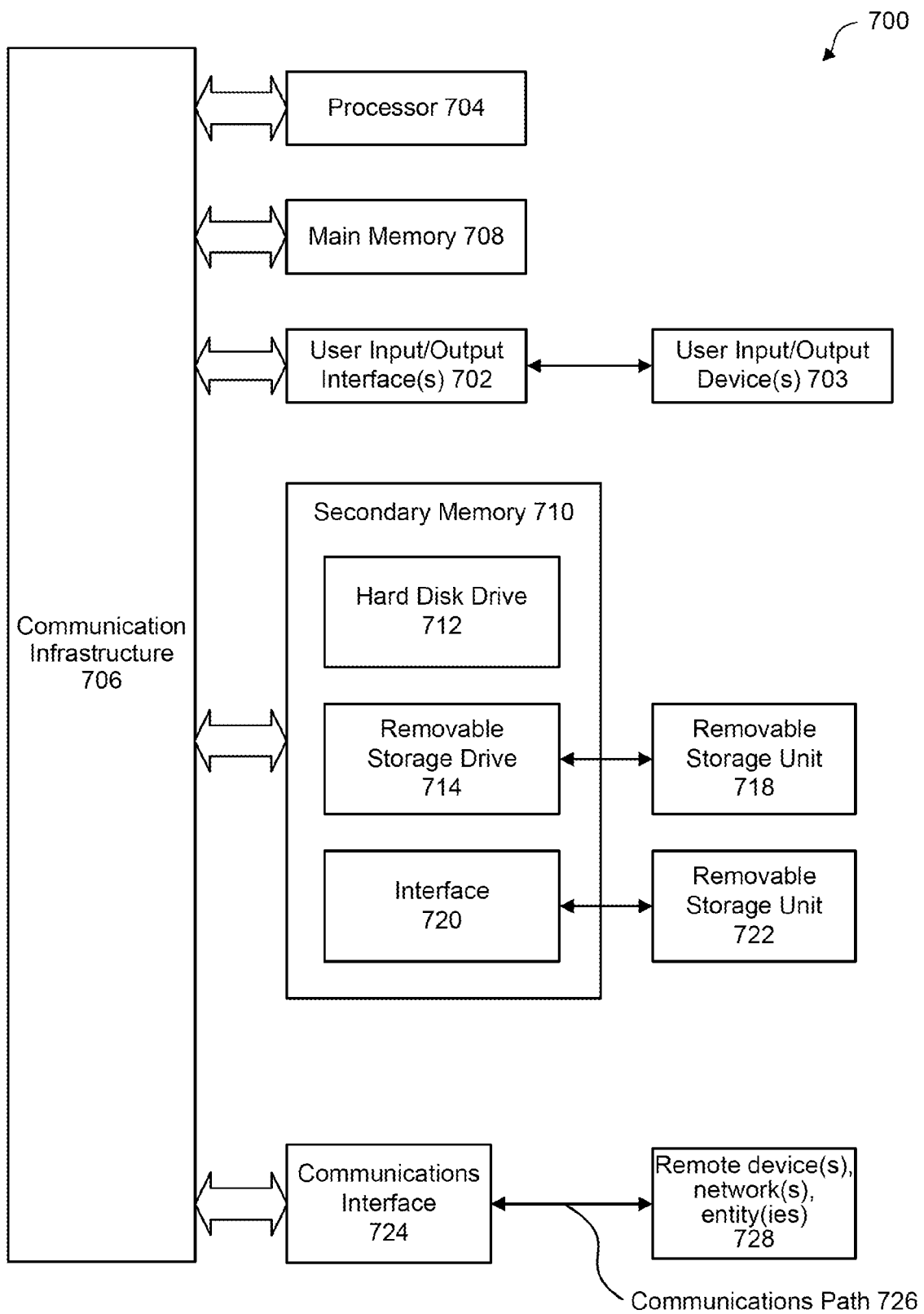
FIG. 7 illustrates a block representation of an exemplary generic computer system capable of implementing certain aspects of the present disclosure.

Various aspects can be implemented, for example, using one or more computer systems, such as computer system 700 shown in FIG. 7. Computer system 700 can be any well-known computer capable of performing the functions described herein such as devices 710, 720 of FIG. 7, or 200 of FIG. 2. Computer system 700 includes one or more processors (also called central processing units, or CPUs), such as a processor 704. Processor 704 is connected to a communication infrastructure 706 (e.g., a bus.) Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

Examples

Example 1 includes a user equipment having a transceiver configured to send and receive signals with a base station and one or more processors coupled with the transceiver. The one or more processors are configured to generate a message indicating whether the UE is capable of beam sweeping, transmit, via the transceiver, the message to the base station.

Example 2 includes the user equipment of example 1, wherein the one or more processors are further configured to receive a response signal from the base station confirming the reception configuration.

Example 3 includes the user equipment of example 1, wherein the message signal identifies, for all Channel State Information (CSI) types, whether intra-symbol beam sweeping is supported.

Example 4 includes the user equipment of example 1, wherein the message identifies, for a subset of Channel State Information (CSI) types, whether intra-symbol beam sweeping is supported.

Example 5 includes the user equipment of example 1, wherein the message identifies, for each Channel State Information (CSI) type, whether intra-symbol beam sweeping is supported.

Example 6 includes the user equipment of example 1, wherein the one or more processors are further configured to implement a reception configuration based on the message and receive transmission signals from the base station using the reception configuration, wherein the received transmission signals include secondary information transmitted with a beam sweeping symbol in an uncorrelated direction to the beam sweeping symbol.

Example 7 includes the user equipment of claim 2, wherein the response signal is received in a Radio Resource Control (RRC) signal.

Example 8 includes the user equipment of claim 1 wherein the one or more processors are further configured to establish an initial communication scheme with the base station, detect a change in communication conditions, determine a new communication scheme based on the change in communication conditions, transmit a notification signal to the base station requesting the new communication scheme, and process a subsequent transmission from the base station using the new communication scheme.

Example 9 includes the user equipment of example 8, wherein the notification signal is transmitted in a Medium Access Control (MAC) Control Element (CE) of an uplink transmission.

Example 10 includes the user equipment of claim 9, wherein the transceiver is further configured to receive a response from the base station in response to the notification signal, and wherein the one or more processors are further configured to process the response.

Example 11 includes the user equipment of example 10, wherein the one or more processors are further configured to implement the new communication scheme a predetermined amount of time after receiving the response from the base station.

Example 12 includes the user equipment of example 11, wherein the predetermined amount of time is a duration of 28 signal symbols.

Example 13 includes the user equipment of example 10, wherein the response is an uplink grant to scheme a new transmission for a same Hybrid Automatic Repeat Request (HARQ) process used for transmission of the MAC CE.

Example 14 includes the user equipment of example 8, wherein the change in communication conditions includes a movement speed of the user equipment.

Example 15 includes a base station for dynamically updating a communication scheme with a user equipment (UE) that includes a transceiver configured to communicate with the UE and one or more processors. The one or more processors are configured to establish an initial communication scheme with the UE, detect a change in communication conditions, generate a notification signal to the UE for informing the UE of a new communication scheme, transmit the notification signal to the UE, and implement the new communication scheme in response to the transmitting of the notification signal.

Example 16 includes the base station of example 15, wherein the notification signal is transmitted in Downlink Control Information (DCI).

Example 17 includes the base station of example 16, wherein the notification signal is transmitted as a new field in the DCI.

Example 18 includes the base station of example 16, wherein the notification signal is transmitted as a new use of an existing field in the DCI.

Example 19 includes the base station of example 18, wherein the existing field is a CSIRequest field.

Example 20 includes the base station of example 15, wherein the one or more processors are further configured to wait a predetermined amount of time after the transmitting of the notification signal to implement the new communication scheme.

Example 21 includes any of the examples described above, wherein the multiple beams are transmitted via a Synchronization Signal Block signal.

Example 22 includes any of the examples described above, wherein each of the beams are transmitted in different directions.

Example 23 includes any of the examples described above, wherein at least some of the signaling between the UE and the base station occur using a Channel State Information Reference Signal (CSI-RS).

Example 24 includes any of the examples described above, wherein the CSI-RS has an Interleaved Frequency Division Multiple Access (IFDMA) structure.

Example 25 includes any of the examples described above, wherein the subset of CSI types includes those with repetition or those without repetition.

Example 26 includes any of the examples described above, wherein the dynamic updated transmitted by the base station is added to the RRC parameter CSI-AssociatedReportConfigInfo or CSI-AperiodicTriggerState.

Example 27 includes the UE of example 1, wherein the reception configuration enables simultaneous reception of a beam sweeping transmission and a second transmission from the base station.

Example 28 includes the UE of example 27, wherein the one or more processors are configured to disable a beam sweeping operation in response to the simultaneous reception.

Example 29 includes the UE of example 27, wherein the one or more processors are further configured to receive a Transmission Configuration Indicator (TCI) from the base station via the transceiver, and set an action time for performing beam sweeping prior to implementing the reception configuration.

Example 30 includes the UE of example 15, wherein the one or more processors are further configured to transmit a response signal to the UE confirming the new communication scheme, wherein the response signal is transmitted in a Radio Resource Control (RRC) signal.

Example 31 includes the UE of example 3, wherein the subset of CSI types are CSIs capable of repetition.

Example 32 includes a method for implementing implementing beam sweeping at a user equipment (UE), the method comprising generating a message that indicates whether the UE is capable of beam sweeping and transmitting, via a transceiver, the message to the base station.

Example 33 includes the method of example 32, wherein the message identifies whether intra-symbol beam sweeping is supported.

Example 34 includes the method of example 32, wherein the message identifies, for all Channel State Information (CSI) types, whether intra-symbol beam sweeping is supported.

Example 35 includes the method of example 32, wherein the message identifies, for a subset of Channel State Information (CSI) types, whether intra-symbol beam sweeping is supported.

Example 36 includes the method of example 32, wherein the message identifies, for each Channel State Information (CSI) type, whether intra-symbol beam sweeping is supported.

Example 37 includes the method of example 32, further comprising implementing a reception configuration based on the message and receive transmission signals from the base station using the reception configuration, wherein the received transmission signals include secondary information transmitted with a beam sweeping symbol in an uncorrelated direction to the beam sweeping symbol.

Example 38 includes the method of example 32, further comprising receiving a response signal from the base station confirming the reception configuration, wherein the response signal is received in a Radio Resource Control (RRC) signal.

Example 39 includes a method for dynamically updating a communication scheme with a user equipment (UE), the method comprising establishing an initial communication scheme with the UE, detecting a change in communication conditions, generating a notification signal to the UE for informing the UE of a new communication scheme, transmitting, via a transceiver, the notification signal to the UE, and implementing the new communication scheme in response to the transmitting of the notification signal.

Example 40 includes the method of example 39, wherein the notification signal is transmitted in Downlink Control Information (DCI).

Example 41 includes the method of example 39, wherein the notification signal is transmitted as a new field in the DCI.

Example 42 includes the method of example 39, wherein the notification signal is transmitted as a new use of an existing field in the DCI.

Example 43 includes the method of example 42, wherein the existing field is a CSIRequest field.

Example 44 includes the method of example 39, further comprising waiting a predetermined amount of time after the transmitting of the notification signal to implement the new communication scheme.

Example 45 includes a base station comprising a transceiver configured to send and receive wireless signals with a user equipment (UE) and one or more processors couples with the transceiver. The one or more processors are configured to receive a message from the UE indicating whether the UE is capable of beam sweeping and transmit, via the transceiver, a beam sweeping message to the UE based on the received message.

Example 46 includes the method of example 45, wherein the message identifies whether intra-symbol beam sweeping is supported.

Example 47 includes the method of example 45, wherein the message identifies, for all Channel State Information (CSI) types, whether intra-symbol beam sweeping is supported.

Example 48 includes the method of example 45, wherein the message identifies, for a subset of Channel State Information (CSI) types, whether intra-symbol beam sweeping is supported.

Example 49 includes the method of example 45, wherein the message identifies, for each Channel State Information (CSI) type, whether intra-symbol beam sweeping is supported.

Example 50 includes the method of example 45, wherein the one or more processors are further configured to implement a transmission configuration based on the received message and transmit signals to the UE using the transmission configuration, wherein the transmitted signals include secondary information transmitted with a beam sweeping symbol in an uncorrelated direction to the beam sweeping symbol.

Example 51 includes the method of example 45, wherein the one or more processors are further configured to transmit a response signal to the UE confirming the transmission configuration, wherein the response signal is transmitted in a Radio Resource Control (RRC) signal.

Example 52 includes the method of example 45, wherein the one or more processors are further configured to receive, from the UE, a notification signal requesting a new communication scheme, the notification signal transmitted during an uplink transmission following an uplink grant from the base station and transmit a subsequent transmission to the UE using the new communication scheme.

Example 53 includes the method of example 52, wherein the notification signal is received in a Medium Access Control (MAC) Control Element (CE) of an uplink transmission.

Example 54 includes the method of example 53, wherein the transceiver is further configured to transmit a response to the UE in response to the notification signal.

Example 55 includes the method of example 54, wherein the one or more processors are further configured to implement the new communication scheme a predetermined amount of time after transmitting the response to the UE.

Example 56 includes the method of example 55, wherein the predetermined amount of time is a duration of 28 signal symbols.

Example 57 includes the method of example 52, wherein the response is an uplink grant to scheme a new transmission for a same Hybrid Automatic Repeat Request (HARQ) process used for transmission of the MAC CE.

What is claimed is:

1. A user equipment (UE), comprising:
 a transceiver configured to send and receive wireless signals with a base station; and
 one or more processors coupled with the transceiver configured to:
  generate a message that indicates whether the UE is capable of intra-symbol beam sweeping;
  transmit, via the transceiver, the message to the base station;
  implement a reception configuration based on the message; and
  receive transmission signals from the base station using the reception configuration,
 wherein the received transmission signals include secondary information transmitted with a beam sweeping symbol in an uncorrelated direction to the beam sweeping symbol.

2. The UE of claim 1, wherein the message identifies whether intra-symbol beam sweeping is supported by the UE for at least one Channel State Information (CSI) type.

3. The UE of the claim 1, wherein the message identifies, for all Channel State Information (CSI) types, whether intra-symbol beam sweeping is supported, or identifies, for a subset of CSI types, whether intra-symbol beam sweeping is supported.

4. The UE of claim 1, wherein the one or more processors are further configured to determine whether the UE is capable of intra-symbol beam sweeping.

5. The UE of claim 1, wherein the message separately identifies, for each Channel State Information (CSI) type, whether intra-symbol beam sweeping is supported.

6. The UE of claim 1, wherein the one or more processors are further configured to receive a response signal from the base station confirming the reception configuration, wherein the response signal is received in a Radio Resource Control (RRC) signal.

7. The UE of claim 1, wherein the one or more processors are further configured to:
- establish an initial communication scheme with the base station;
- detect a change in communication conditions;
- determine a new communication scheme based on the change in communication conditions;
- transmit, via the transceiver, a notification signal to the base station requesting the new communication scheme, the notification signal transmitted during an uplink transmission following an uplink grant from the base station; and
- process a subsequent transmission from the base station using the new communication scheme.

8. The UE of claim 7, wherein the notification signal is transmitted in a Medium Access Control (MAC) Control Element (CE) of an uplink transmission.

9. The UE of claim 8, wherein the transceiver is further configured to receive a response from the base station in response to the notification signal, and wherein the one or more processors are further configured to process the response.

10. The UE of claim 9, wherein the one or more processors are further configured to implement the new communication scheme a predetermined amount of time after receiving the response from the base station.

11. The UE of claim 10, wherein the predetermined amount of time is a duration of 28 signal symbols.

12. The UE of claim 9, wherein the response is an uplink grant to scheme a new transmission for a same Hybrid Automatic Repeat Request (HARQ) process used for transmission of the MAC CE.

13. The UE of claim 7, wherein the change in communication conditions includes a movement speed of the user equipment.

* * * * *

UNITED STATES PATENT AND TRADEMARK OFFICE
CERTIFICATE OF CORRECTION

PATENT NO. : 12,132,551 B2
APPLICATION NO. : 17/442456
DATED : October 29, 2024
INVENTOR(S) : Zhang et al.

Page 1 of 1

It is certified that error appears in the above-identified patent and that said Letters Patent is hereby corrected as shown below:

In the Claims

In Column 14, Claim 3, Line 60, delete "of the" and insert -- of --, therefor.

In Column 15, Claim 7, Lines 9-10, delete "wherein the one or more processors are further configured to:" and insert the same on Line 10 as a new insertion point.

Signed and Sealed this
Tenth Day of December, 2024

Katherine Kelly Vidal
*Director of the United States Patent and Trademark Office*